(12) United States Patent
Heller

(10) Patent No.: US 6,659,252 B2
(45) Date of Patent: Dec. 9, 2003

(54) CLUTCH ACTUATING APPARATUS

(75) Inventor: Jean-Francois Heller, Wooster, OH (US)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/185,434

(22) Filed: Jun. 28, 2002

(65) Prior Publication Data

US 2003/0010595 A1 Jan. 16, 2003

(30) Foreign Application Priority Data

Jun. 28, 2001 (DE) .......................................... 101 31 221

(51) Int. Cl.$^7$ .............................................. F16D 25/08
(52) U.S. Cl. ................. 192/85 CA; 192/91 A; 192/98
(58) Field of Search ........................ 192/85 CA, 91 A, 192/98

(56) References Cited

U.S. PATENT DOCUMENTS

| | | | |
|---|---|---|---|
| 5,135,092 A | | 8/1992 | Jäckel |
| 5,620,076 A | * | 4/1997 | Voit et al. ................. 192/70.25 |
| 5,632,706 A | | 5/1997 | Kremmling et al. |
| 6,056,446 A | * | 5/2000 | Welter et al. ................ 384/607 |
| 6,076,645 A | * | 6/2000 | Winkelmann et al. .. 192/85 CA |
| 6,328,148 B2 | * | 12/2001 | Winkelmann et al. .. 192/85 CA |

* cited by examiner

*Primary Examiner*—Richard M. Lorence
(74) *Attorney, Agent, or Firm*—Darby & Darby

(57) ABSTRACT

The housing of the slave cylinder in an apparatus for actuating a friction clutch between the engine and the input shaft of the change-speed transmission in the power train of a motor vehicle has a one-piece metallic or plastic member which is non-rotatably affixed to the transmission case. The annular piston of the slave cylinder carries a clutch release bearing and is surrounded by a wall of the housing; this piston slidably surrounds a deep-drawn metallic guide sleeve which is centered in the transmission case and has a flange secured to a collar of the housing by two or more lugs having mutually inclined portions partially bent around and partially recessed into the collar.

20 Claims, 1 Drawing Sheet

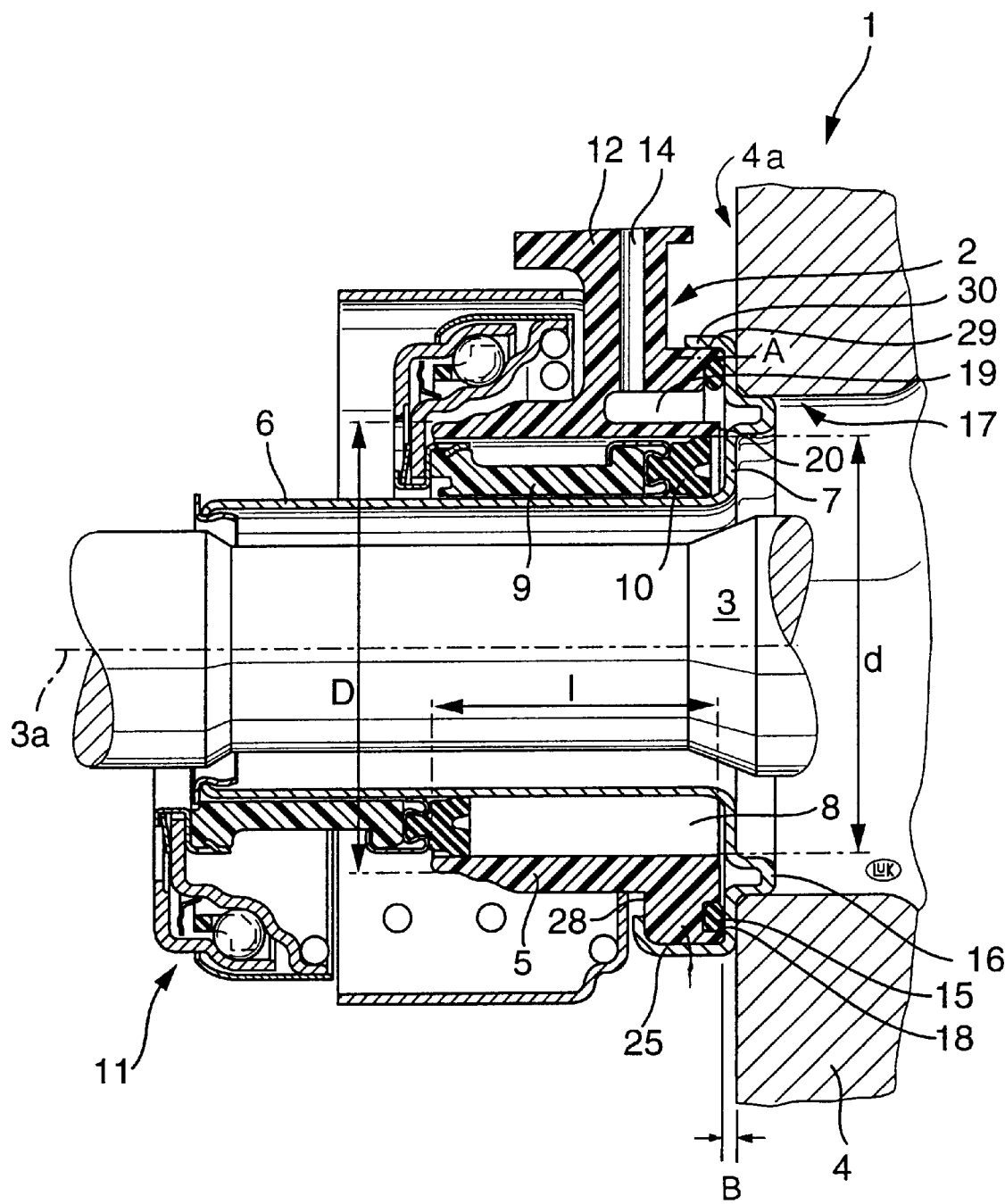

CLUTCH ACTUATING APPARATUS

CROSS-REFERENCE TO RELATED CASES

This application claims the priority of the commonly owned copending German patent application Serial No. 101 31 221.0 filed Jun. 28, 2001. The disclosure of the aforesaid copending patent application, as well as that of each US and foreign patent and patent application identified in the specification of the present application, is incorporated herein by reference.

BACKGROUND OF THE INVENTION

The present invention relates to improvements in apparatus for actuating cutches, and more particularly to improvements in fluid-operated apparatus for engaging and/or disengaging clutches in the power trains of motor vehicles. Apparatus of the type to which the present invention pertains are known as concentric or central fluid-operated (such as hydraulic) clutch actuating apparatus.

Certain presently known clutch actuating apparatus employ a slave cylinder having a housing which is coaxial with the input shaft of the change-speed transmission, which confines a reciprocable piston, and which is separably affixed to the housing or case of the transmission. The piston is a hollow cylindrical body which is reciprocable in the slave cylinder housing and surrounds a stationary hollow cylindrical guide which, in turn, surrounds and is spaced apart from the adjacent portion of the input shaft of the transmission. One end portion of the cylindrical guide is provided with a flange or collar which is confined between the slave cylinder housing and the adjacent end portion of the transmission case. One end portion of the piston of the slave cylinder is provided with an annular sealing element which is disposed at one axial end of a plenum chamber and sealingly engages the internal surface of the slave cylinder housing as well as the external surface of the hollow cylindrical guide. The other end portion of the piston mounts a clutch release bearing which can actuate the friction clutch, e.g., by pivoting a set of prongs or tongues provided on a diaphragm spring which can displace a reciprocable pressure plate in the housing of the friction clutch. When the clutch is at least partially engaged, it can transmit torque between an output element of the prime mover (such as an internal combustion engine or a hybrid drive) and the input shaft of the transmission. The release bearing can actuate the clutch in response to admission of a pressurized fluid (e.g., oil) into the plenum chamber; such fluid can be admitted into or evacuated from the plenum chamber by way of one or more passages in the housing of the slave cylinder, e.g., by way of a radially extending nipple which is affixed to or is of one piece with the housing of the slave cylinder.

A clutch actuating apparatus of the just outlined character is disclosed, for example, in German patent application Serial No. 43 13 346. The housing of the slave cylinder in the apparatus of this German patent application comprises two tubular sections which are made of sheet metal and one of which surrounds the other. One end portion of the outer section is sealingly and non-separably affixed to one end portion of the inner section and is attached to the case of the change-speed transmission. These sections define an annular plenum chamber which can receive pressurized fluid by way of a conduit one end portion of which is received in a hole of the outer section and which is sealingly secured to the outer section, e.g., by soldering.

German patent application Serial No. A 41 29 370 discloses a modified clutch actuating apparatus wherein the slave cyinder employs a one-piece housing made of a plastic material.

OBJECTS OF THE INVENTION

An object of the present invention is to provide a simple, compact and inexpensive apparatus for actuating friction clutches in the power trains of motor vehicles.

Another object of this invention is to provide a novel and improved slave cylinder for use in the clutch actuating apparatus.

A further object of the instant invention is to provide novel and improved connections between the constituents of the clutch actuating apparatus.

An additional object of my invention is to provide novel and improved means for centering the constituents of the clutch actuating apparatus relative to each other and/or relative to component parts of the power train.

Still another object of the invention is to construct and assemble the clutch actuating apparatus in such a way that it automatically compensates for progressing wear upon its component parts.

A further object of the invention is to provide novel and improved means for guiding the reciprocable piston of the slave cylinder in the above outlined clutch actuating apparatus.

Another object of the present invention is to provide a novel and improved housing for the slave cylinder in the above outlined clutch actuating apparatus.

An additional object of the invention is to provide novel and improved combinations of materials for the constitutents of the above outlined apparatus.

Still another object of the invention is to provide a clutch actuating apparatus which generates less heat than heretofore known apparatus.

SUMMARY OF THE INVENTION

The invention is embodied in a fluid-operated apparatus for actuating a friction clutch between a prime mover (such as an internal combustion engine) and a rotary component (such as the input shaft) in a housing or case of a change-speed transmission in the power train of a motor vehicle. The improved apparatus comprises a slave cylinder including a housing which is coaxial with the rotary component of the transmission and is borne by the transmission case, and a reciprocable annular piston which is disposed in the housing and is surrounded by a wall forming part of the housing. The apparatus further comprises a guide sleeve which surrounds the rotary component of the transmission, which is surrounded by the piston and which defines with the piston and with the wall of the housing a fluid-receiving annular plenum chamber. The sleeve includes a radially outwardly extending flange which is disposed between an end portion of the wall and an end face of the transmission case, and the apparatus further comprises means for coupling the flange to the wall. The coupling means includes a plurality of projections which are borne by the flange of the guide sleeve and are spaced apart from each other in the circumferential direction of the wall. Each projection has a first portion surrounding the end portion of the wall and a second portion which is recessed into the wall. The end portion of the wall preferably includes or constitutes a collar which is adjacent the end face of the transmission case.

The apparatus further comprises fasteners which serve to secure the housing of the slave cylinder to the transmission case. It normally or often suffices to employ a small number of (such as two) fasteners.

The plenum chamber is arranged to receive a hydraulic fluid at a pressure which can vary within a predetermined range, and the apparatus further comprises at least one seal which is provided between the housing and the guide sleeve and is arranged to withstand fluid pressures at least within the predetermined range.

Still further, the improved apparatus preferably comprises means for centering the guide sleeve relative to the housing of the slave cylinder and/or means for centering the housing and/or the guide sleeve relative to the transmission case. The latter centering means can include a portion of the guide sleeve, e.g., an annular protuberance of the flange; such protuberance is or can be surrounded and centered by an internal surface of the transmission case.

The aforementioned first and second portions of the projections of the coupling means can make oblique angles, preferably obtuse angles.

The piston of the slave cylinder has a first end portion which is nearer to and a second end portion which is more distant from the flange of the guide sleeve. A clutch release bearing is or can be mounted on the second end portion and an annular seal can be provided on the first end portion of the piston. Such annular seal is in sealing engagement with the wall of the housing of the slave cylinder as well as with the external surface of the guide sleeve.

The housing of the slave cylinder can be made in an injection molding machine of one piece with at least one nipple defining at least a portion of a path for the flow of pressurized fluid into the chamber and/or for the outflow of fluid from such chamber. It is presently preferred to make the housing from aluminum or from a plastic substance.

The guide sleeve preferably consists of a metallic sheet material, e.g., sheet steel, and can be made in a deep drawing machine.

If the housing of the slave cylinder is made of a metallic material, it is preferably a die cast product.

The wall of the housing of the slave cylinder has a preferably at least partially conical internal surface which tapers in the axial direction of the input shaft of the transmission toward the flange of the guide sleeve.

The novel features which are considered as characteristic of the invention are set forth in particular in the appended claims. The improved clutch actuating apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

The single FIGURE is a fragmentary axial sectional view of a clutch actuating apparatus which embodies one form of the present invention and employs a slave cylinder having a housing affixed to the case of the change-speed transmission in the power train of a motor vehicle.

DESCRIPTION OF PREFERRED EMBODIMENTS

The single FIGURE shows a hydraulically operated clutch actuating apparatus 1 which comprises a slave cylinder having a plastic housing 2 and an annular piston 9 reciprocably received in the housing. The axis 3a of the piston 9 coincides with the axis of the input shaft 3 in the housing or case 4 of a change-speed transmission which is installed in the power train of a motor vehicle and can transmit torque to a differential when the apparatus 1 is operative, i.e., when it at least partially engages a friction clutch which serves to transmit torque between the rotary output element (such as a camshaft or a crankshaft) of a prime mover (e.g., an internal combustion engine or a hybrid drive) and the input shaft 3 of the transmission.

Those movable portions of the apparatus 1 which are located above the axis 3a are shown in positions they assume when the friction clutch is disengaged, and the movable portions below the axis 3a are shown in the positions they assume when the friction clutch is engaged. The piston 9 of the slave cylinder carries a release bearing 11 which can actuate the clutch, e.g., by engaging the tongues or prongs of a clutch spring (such as a diaphragm spring) which is a component part of the clutch and urges an axially movable pressure plate against a rotating counterpressure plate when the friction clutch is at least partly engaged. Reference may be had, for example, to commonly owned U.S. Pat. No. 5,135,092 (granted Aug. 4, 1992 to Jackel for "APPARATUS FOR TRANSMITTING TORQUE") which shows a release bearing (not referenced) adjacent the prongs of a diaphragm spring forming part of a friction clutch in the power train of a motor vehicle. Commonly owned U.S. Pat. No. 5,632,706 (granted May 27, 1997 to Kremmling et al. for "MOTOR VEHICLE WITH ELECTRONIC CLUTCH MANAGEMENT SYSTEM") shows a slave cylinder which, in contrast to the slave cylinder in the apparatus 1 of the present invention, is not coaxial with the release bearing but is operatively connected with the latter by a linkage including a piston rod and a lever.

The housing 2 of the slave cylinder is coaxial with the input shaft 3 of the change-speed transmission and further includes a cylindrical metallic guide sleeve 6 which is surrounded by the piston 9 of the slave cylinder and is affixed to the housing 2 in a novel and improved way. The housing 2 is separably secured to the transmission case 4 by a set of threaded fasteners or in any other suitable manner. The guide sleeve 6 is preferably a deep drawn article (i.e., an article which is made in a non-cutting shaping machine) and is spaced apart from the cylindrical wall 5 of the housing 2 as well as from the input shaft 3 (as seen radially of the axis 3a). The positions of two fasteners are indicated at A and B. It is possible to employ more than two fasteners.

That end portion of the guide sleeve 6 which is remote from the clutch release bearing 11 is provided with an annular flange or collar 7 which includes several stepped portions (as seen in the direction of the axis 3a as well as radially thereof) and surrounds and is affixed to an annular external collar 27 of the wall 5. An annular projection 16 of the flange 7 engages the internal surface 17 of the transmission case 4 and centers the latter relative to the housing 2 and vice versa. The guide sleeve 6, its flange 7, the wall 5 of the housing 2 and an annular lip seal 10 at the right-hand axial end of the piston 9 define an annular plenum chamber 8 which receives a pressurized fluid (such as oil) at least when the piston 9 and the release bearing 11 are to be moved axially from the positions shown in the upper half to the positions shown in the lower half of the drawing. The seal 10 has a substantially U-shaped cross-sectional outline and is coupled to the adjacent end portion of the piston 9; one of its lips sealingly engages the external surface of the guide sleeve 6 and its other lip is in sealing engagement with the internal surface of the wall 5.

The means for supplying pressurized fluid to the plenum chamber 8 in order to disengage the friction clutch includes a nipple 12 which, in the illustrated embodiment, is of one piece with the wall 5 of the housing 2 and extends at least substantially radially of and away from the axis 3a. The axial bore or hole 14 of the nipple 12 can receive pressurized fluid from a suitable source, e.g., from a master cylinder (refer again to the aforementioned U.S. Pat. No. 5,632,706 to Kremmling et al). The master cylinder is controlled by a pendulum arrangement or by an automatic actuator, not shown. The drawing shows a nipple 12 which can serve as a means for supplying pressurized fluid to and also as a means for evacuating fluid from the plenum chamber 8. However, it is equally within the purview of the invention to employ several nipples or to provide the illustrated nipple 12 with at least two passages which can be spaced apart from each other in the direction of the axis 3a, one of which serves to supply pressurized fluid to and to evacuate fluid from the plenum chamber, and the other of which serves exclusively to guide a stream of a suitable fluid medium.

As already mentioned hereinbefore, the illustrated housing 2 and its nipple 12 are made of a plastic material, preferably in an injection molding machine. This renders it possible to avoid secondary treatment of such component of the improved clutch actuating apparatus. In fact, even the internal surface of the wall 5 (i.e., that surface which is engaged by the radially outer lip of the seal 10) need not be subjected to a finishing treatment, and the same applies for those surfaces of the collar 27 of the wall 5 which are contacted by portions of the annular flange 7 of the guide sleeve 6. This contributes significantly to lower cost of the housing 2 as well as of the entire clutch actuating apparatus 1.

Another advantage of the improved housing 2 and of its nipple 12 is that these parts need not be sealingly secured (such as welded) to each other in a separate operation and that the nipple stiffens (reinforces) the housing.

However, it is equally within the purview of the present invention to employ a slave cylinder housing (2) and a separately produced nipple (12) which latter is suitably (sealingly) secured to the housing; this embodiment can be resorted to if the housing 2 is or should be configurated in such a way that it can be put to use in the improved apparatus 1 as well as in other types of apparatus, machines or the like. Still further, it is possible to produce the housing 2 and the nipple 12 as two separate parts if the configuration of the nipple departs from that shown in the drawing to a considerable extent, e.g., because a more complex nipple is necessary due to the location and/or nature of the actual source (e.g., a pump) of pressurized fluid for the plenum chamber 8. Under the just outlined circumstances, the housing 2 can often remain unchanged and is connected with a separately produced nipple which is suitable for the establishment of a connection between the chamber 8 and the actual or primary source of pressurized fluid.

A separately produced guide sleeve can also constitute a mass-produced part and can be dimensioned in such a way that it can be utilized with the plastic housing 2 in the illustrated apparatus 1 as well as in other apparatus, machines, units or assemblies which can employ a slave cylinder having a housing 2 and a piston 9. Such arrangement is desirable because a single shaping device is needed to mass produce a desired or required number of guide sleeves 6 and a single extruder is necessary to mass produce a requisite number of housings 2. The guide sleeve 6 can constitute a thin-walled part which can be mass produced in any suitable manner, e.g., in a relatively simple and inexpensive deep drawing unit.

An advantage of the illustrated apparatus (wherein the housing 2 and the guide sleeve 6 are two separately produced parts) over apparatus having plastic housings which are of one piece with plastic guide sleeves is that its dimensions (particularly as seen radially of the axis 3a) are or can be a fraction of the dimensions of an apparatus having a plastic guide sleeve and that a metallic guide sleeve is normally better suited for reliable guidance of the piston 9 and its annular seal 10. Satisfactory guidance of the piston is desirable in order to maintain the friction (and hence the generation of heat) at a minimum value. Generation of small quantities of heat is desirable not only for the parts which are in frictional engagement with and must move relative to each other but also for the entire clutch actuating apparatus and for the parts which are connected therewith or are adjacent thereto.

The internal surface of the wall 5 preferably exhibits a certain (relatively small) amount of conicity in that it tapers in a direction from the non-illustrated friction clutch toward the transmission case 4. The length of the frustoconical internal surface of the wall 5 is shown at 1, its maximum diameter is shown at D, and its minimum diameter is shown at d. The taper of the internal surface of the wall 5 is preferably gradual all the way from D to d. The just discussed conicity of the internal surface of the wall 5 exhibits the advantage that it allows for a compensation for wear upon certain constituents of the friction clutch, such as the pressure plate and/or the counterpressure plate and/or the friction linings of the clutch disc. As the wear upon the just enumerated parts of the friction clutch progresses, the neutral position of the piston 9 is shifted in a direction toward the transmission case 4. The conicity of the internal surface of the wall 5 also compensates for progressing wear upon the lips of the annular seal 10 at the respective axial end of the wall 5. In the absence of conicity of the internal surface of the wall 5, pressurized fluid could leak from the plenum chamber 8 in a direction to the left, as viewed in the drawing.

The annular flange 7 of the guide sleeve 6 is provided with projections 25 in the form of lugs which are bent around the outer side of the end portion or collar 27 of the wall 5 and have end portions bent into radial undercuts or recesses 28 provided in that surface of the collar 27 which faces away from the end face 4a of the transmission case 4. The collar 27 can constitute a circumferentially complete body or it can consist of an annular array of discrete external protuberances provided at that axial end of the wall 5 which is adjacent the transmission case 4. Each projection or lug 25 can comprise two portions which can make an oblique (particularly obtuse) angle, e.g., an angle close to 90°.

Once the initial stage of assembly of the wall 5 and the flange 7 is completed, the projections 25 are deformed around the collar 27 and their end portions are caused to enter the respective recesses 28. This can be accomplished by resorting to readily available rudimentary tools, i.e., without the need for specially designed complex and expensive implements or machines. The thickness of the guide sleeve 6 and its flange 7, the number of projections 25 as well as the axial dimension of the collar 27 can be selected in such a way that the properly assembled parts 5, 27 and 6, 7, 25 can readily withstand the maximum anticipated pressure of fluid in the plenum chamber 8 without it being necessary to make the parts 2 and 6 of highly expensive materials. Thus, the anticipated pressures of fluid in the plenum chamber 8 can be readily withstood without it being necessary to provide special highly resistant connections or couplings between the transmission case 4 on the one hand and the housing 2 and/or the guide sleeve 6 on the other hand.

It has been ascertained that a reliable connection between the housing 2 and the guide sleeve 6 can be established by providing the latter with between 2 and 10 (preferably between 3 and 6) projections 25. It was further ascertained that the reliability of the connection or coupling including the projections 25 can be greatly enhanced if such projections are bent through more than 90° at the circumferentially complete part of the flange 7 and/or if the mutually inclined portions of each projection 25 make an angle exceeding 90°.

Another advantage of the aforedescribed and illustrated connection or coupling between the guide sleeve 6 and the housing 2 is that it renders it possible to simplify the attachment of the apparatus 1 to the transmission case 4 as well as to simplify and thus reduce the cost of the case 4, especially of that portion of this part which is adjacent the housing 2 of the slave cylinder ad surrounds the illustrated part of the input shaft 3. Thus, the connection between the transmission case 4 and the apparatus 1 need not take up any, or any appreciable, axial forces, i.e., this connection should merely suffice to prevent accidental (unintentional) separation of the transmission case 4 and the apparatus 1 from each other as seen in the direction of the axis 3a. This also contributes, significantly, to lower cost of the apparatus 1, of the transmission including the shaft 3 and the case 4, and the entire power train if the improved apparatus 1 is employed in a motor vehicle. It normally suffices to secure the apparatus 1 to the transmission case 4 by resorting to relatively simple undertakings such as pins, threaded fasteners, dowels and/or the like. Moreover, it is now possible to greatly reduce the overall number of discrete fasteners (e.g., screws or bolts), for example, to not more than two. It is also possible to employ two or more fasteners which need not be identical with each other.

The drawing further shows a ring-shaped seal 15 which is recessed into a groove 18 in the collar 27 of the wall 5 (i.e., into the housing 2 of the slave cylinder) and is in sealing engagement with the adjacent annular portion of the flange 7. It is also possible to recess the seal 15 or an equivalent thereof into the flange 7 in such a way that it is in requisite sealing engagement with the adjacent portion of the collar 27 or with another part of the wall 5. The seal 15 is shown as being located radially outwardly of the annular projection 16 which is provided on the flange 7 and centers the guide sleeve 6 (and hence the housing 2) by extending into the passage 17 of the transmission case 4. It is clear that the seal 15 can be located radially inwardly of the projection 16 or that the seal between the housing 2 and the guide sleeve 6 can include several sealing elements, e.g., a first ring-shaped seal (15) radially outwardly of the projection 16 and a second sealing ring (which may but need not be similar to or identical with the seal 15) radially inwardly of the projection 16. Still further, a major part of the illustrated seal 15 can be located radially inwardly of a channel 19 in the housing 2 and the remaining part of such seal can surround this channel. The channel 19 serves to connect the bore or hole 14 of the nipple 12 with the plenum chamber 8, either directly or by way of an annular clearance 20 between the flange 7 and the wall 5. Savings in the cost of making the improved apparatus 1 can be achieved if the annular recess of the projection 16 serves to receive the seal 15, i.e., if the groove 18 is omitted and the collar 27 is in direct engagement with a seal (such as 15) in the recess of the projection 16. This renders it possible to employ a relatively simple injection molding tool for the housing 2.

It is further of advantage to place the aforementioned clearance 20 for the flow of fluid between the channel or channels 19 and the annular plenum chamber 8 at or close to the same distance from the axis 3a as the annular projection 16 so that the volume of the clearance is increased. Alternatively, the clearance 20 can be omitted if the projection 16 is positioned in such a way that its annular space serves to establish a path for the flow of fluid between the channel or channels 19 (i.e., between the hole or bore 14) and the plenum chamber 8; this renders it possible to reduce the axial length of the apparatus 1.

The guide sleeve 16 is centered relative to the housing 2 of the slave cylinder by those portions of the projections 25 which overlie the circumferentially complete or composite radially outermost surface 29 of the collar 27 of the wall 5. In addition to or in lieu of the projections 25 of the flange 7, the centering means between the parts 2 and 6 can include suitably configurated discrete sheet metal sections or parts 30 which are welded or otherwise affixed to the flange 7 and overlie portions of the collar 27. The parts 30 can have openings or outlets for the flow of fluid from the plenum chamber 8.

To summarize: The housing 2 can be made of a metallic or plastic material. The metallic material is or can be aluminum which is preferably shaped in a die casting machine; this results in the making of a lightweight housing which can stand long periods of use. The guide sleeve 6 can be made of sheet steel in a deep drawing machine. The aforedescribed projections or lugs 25 exhibit the already described advantages in addition to being capable of reliably withstanding frequently recurring or less frequent enormous pressures of fluid (such as oil or another suitable hydraulic fluid) in the plenum chamber 8. This renders it possible to dispense with axial supporting of the guide sleeve 6 and of the housing 2 on the transmission case 4. Thus, the fasteners (such as threaded fasteners) at A and B must merely withstand relatively small or minor axial stresses and serve, exclusively or primarily, to prevent accidental separation of the parts 2 and 4 from each other and/or to hold the part 2 against angular movements relative to the part 4 about the axis 3a. This renders it possible to employ a few (e.g., two) simple, lightweight and inexpensive fasteners, such as pins, screws or bolts with threads designed to stand negligible axial stresses. For example, the housing 2 can be provided (at A and B) with holes for reception of fasteners which are anchored in the transmission case 4 and hold the parts 2, 4 against angular movement relative to each other. Of course, the fasteners (e.g., so-called stop bolts or indexing bolts) can also serve to stand at least some axial stresses by holding the parts 2, 4 against unintentional axial movements relative to each other.

The projections 25 of the means for coupling the guide sleeve 6 to the housing 2 can further serve to center the parts 2 and 6 relative to each other. Such centering action is combined with that of the projection 16 at the internal surface 17 of the transmission case 4 to ensure that each of the group of parts 2, 3, 4 and 6 is adequately centered relative to all other parts of such group. Each centering means can include or cooperate with adequate sealing means; for example, at least one sealing ring (not shown) can be confined between the projection 16 and the internal surface 17. The sealing ring or rings between the shaft 3 and the adjacent non-rotary part or parts can constitute a so-called shaft seal or an analogous sealing device, and the sealing means between the parts (such as 2 and 4 and/or 2 and 6) which should not rotate relative to each other can include one or more static seals.

The utilization of a plastic housing 2 (which is made in an injection molding, injection compression or transfer molding machine) in combination with a guide sleeve of metallic sheet material (e.g., a sleeve made of steel in a deep drawing or other non-cutting shaping machine) exhibits the additional advantage that it constitutes an optimal compromise between adequate stability and reasonable cost of the slave cylinder housing. In view of its configuration (i.e., because only the wall 5 is actually contacted by the seal 10 of the piston 9), the housing 2 is particularly suitable for mass production in an injection molding machine. The wall 5 can be dimensioned by taking into consideration the required stability of the housing 2 as well as the required and/or desired maximum dimensions of the clutch release bearing 11 (as seen in a direction radially of the axis 3a). The guide sleeve 6 can be made from a relatively thin sheet steel blank. The assembly of the slave cylinder from such different materials (a plastic material for the housing 2 and a metallic material for the guide sleeve 6) is of advantage on the additional ground that the heating of such parts in actual use of the clutch actuating apparatus 1, as well as the resulting heat-induced expansion, cannot influence or cannot unduly influence the operation (such as the sealing action) of the improved slave cylinder.

The absence of need for any, or for extensive, secondary treatment of the slave cylinder and/or other parts of the improved apparatus, especially in the regions of various seals, contributes significantly to a reduction of the overall cost. In addition, the apparatus 1 is surprisingly compact and its useful life exceeds that of prior clutch actuating apparatus. The metallic sleeve 6 has been found to constitute a highly satisfactory guide for the piston 9 and for its seal 10, i.e., a guide which is much more satisfactory than those which are of one piece with plastic housings of conventional slave cylinders. As already mentioned hereinbefore, neither the internal surface of the wall 5 nor the external surface of the guide sleeve 6 necessitates a secondary treatment for proper guidance of and sealing engagement with the respective lips of the seal 10.

The conical internal surface between the diameters D and d of the housing wall 5 exhibits the aforediscussed advantages involving sealing engagement with the outer lip of the seal 10 in spite of progressing wear upon such lip and/or upon the wall 5 as a result of repeated reciprocatory movements of the piston 9 between its end positions. The larger-diameter end (at D) of the conical internal surface of the wall 5 is more distant from the flange 7 than the smaller-diameter end (at d) of such internal surface. The conicity of the internal surface of the wall 5 can be in the range of 0.5°. Experiments confirm that the wall 5 can adequately compensate for wear upon the outer lip of the seal 10 for long periods of time; the neutral position of the piston 9 simply migrates toward the transmission case 4, i.e., toward the flange 7, at a rate which is a function of the extent of wear upon the outer lip of the seal 10. This ensures that the sealing action between the wall 5 and the outer lip of the seal 10 remains satisfactory for long periods of time, normally during the entire useful life of the friction clutch which is actuated by the apparatus 1, i.e., there is no leakage of pressurized fluid from the plenum chamber 8, around the seal 10 and into the interior of the tubular wall 5 to the left of the seal 10.

The housing 5 can be made of a thermosetting plastic material including phenolic plastics, amino plastics, EP resins and UP resins. Such materials can be utilized in combination with suitable fillers and/or reinforcing substances to reach a strength matching or approximating that of aluminum. Another important advantage of thermosetting plastic materials is that their thermal expansion coefficient is low and that they exhibit a highly satisfactory tear strength.

However, it is also possible to make the housing 2 of a suitable thermoplastic material, e.g., of a polyamide or of polypropylene (PPA).

The nipple 12 can be provided with one or more bores or holes in addition to the one shown at 14. At least one first bore can serve to supply pressurized hydraulic fluid for admission into the plenum chamber 8, and at least one second bore or hole can serve for evacuation of fluid from the slave cylinder including the housing 2. The outer end of the first bore can be connected to a source of pressurized fluid, and the flow of fluid through the outer end of the second bore can be controlled by a valve (not shown) which regulates the fluid pressure in the plenum chamber 8. Eventual punctures of the nipple 12 are effectively sealed, e.g., by welding, by an adhesive and/or by separately produced parts which are threadedly connected to or are press fitted into the punctures.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for actuating clutches and, therefore, such adaptations should and are intended to be comprehended within the meaning and range of equivalence of the appended claims.

What is claimed is:

1. Fluid-operated apparatus for actuating a friction clutch between a prime mover and a rotary component in a case of a change-speed transmission in the power train of a motor vehicle, comprising:

a slave cylinder including a housing coaxial with the rotary component and borne by the case of the transmission, and a reciprocable annular piston disposed in said housing and surrounded by a wall of the housing;

a guide sleeve surrounding the rotary component, surrounded by said piston and defining with the piston and with said wall a fluid-receiving annular plenum chamber, said sleeve including a radially outwardly extending flange between an end portion of said wall and an end face of the transmission case; and means for coupling said flange to said wall, including a plurality of projections borne by said flange and spaced apart from each other in a circumferential direction of said wall, said projections having first portions surrounding said end portion of said wall and second portions recessed into said wall.

2. The apparatus of claim 1, wherein said end portion of said wall includes a collar adjacent the end face of the transmission case.

3. The apparatus of claim 1, further comprising at least two fasteners securing said housing to the transmission case.

4. The apparatus of claim 1, wherein said chamber is arranged to receive a hydraulic fluid at a pressure within a predetermined range, and further comprising at least one seal provided between said housing and said guide sleeve and arranged to withstand fluid pressures at least within said range.

5. The apparatus of claim 1, further comprising means for centering said guide sleeve relative to said housing.

6. The apparatus of claim 1, further comprising means for centering at least one of said housing and said guide sleeve relative to the transmission case.

7. The apparatus of claim 6, wherein said centering means includes a portion of said guide sleeve.

8. The apparatus of claim 7, wherein said portion of said guide sleeve includes an annular protuberance on said flange.

9. The apparatus of claim 8, wherein said protuberance is surrounded by an internal surface of the transmission case.

10. The apparatus of claim 1, wherein said first and second portions of said projections make oblique angles.

11. The apparatus of claim 10, wherein said angles are obtuse angles.

12. The apparatus of claim 1, wherein said piston has a first end portion nearer to and a second end portion more distant from said flange, and further comprising a clutch release bearing provided on said second end portion of said piston.

13. The apparatus of claim 12, further comprising an annular seal provided on said first end portion of said piston and sealingly engaging said wall and said guide sleeve.

14. The apparatus of claim 1, further comprising a nipple of one piece with said housing and defining a portion of a path for the flow of pressurized fluid into said chamber.

15. The apparatus of claim 14, wherein said housing consists of a material selected from the group consisting of aluminum and plastic substances.

16. The apparatus of claim 1, wherein said guide sleeve consists of a metallic sheet material.

17. The apparatus of claim 1, wherein said housing is an injection molded product.

18. The apparatus of claim 1, wherein said guide sleeve is a deep drawn article.

19. The apparatus of claim 1, wherein said housing is a die cast metallic housing.

20. The apparatus of claim 1, wherein said wall has an at least partly conical internal surface which tapers in the direction of the axis of the rotary component toward said flange.

* * * * *